United States Patent
Galtier et al.

(10) Patent No.: US 7,359,793 B2
(45) Date of Patent: Apr. 15, 2008

(54) METHOD FOR THE DETECTION OF MISFIRES IN AN INTERNAL COMBUSTION ENGINE

(75) Inventors: Frédéric Galtier, Montpellier (FR); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 344 days.

(21) Appl. No.: 10/535,729

(22) PCT Filed: Oct. 1, 2003

(86) PCT No.: PCT/DE03/03273

§ 371 (c)(1),
(2), (4) Date: May 19, 2005

(87) PCT Pub. No.: WO2004/046678

PCT Pub. Date: Jun. 3, 2004

(65) Prior Publication Data

US 2006/0089782 A1    Apr. 27, 2006

(30) Foreign Application Priority Data

Nov. 21, 2002   (DE) ................. 102 54 479

(51) Int. Cl.
*G01M 15/11*   (2006.01)
*F02D 41/10*   (2006.01)
*F02D 41/14*   (2006.01)
*F02D 41/22*   (2006.01)

(52) U.S. Cl. .................... 701/111
(58) Field of Classification Search ........ 701/110, 701/111

See application file for complete search history.

(56) References Cited

U.S. PATENT DOCUMENTS

| | | | |
|---|---|---|---|
| 4,562,818 A | | 1/1986 | Kohama et al. |
| 5,056,360 A | * | 10/1991 | Dosdall et al. ............. 73/116 |
| 5,237,504 A | * | 8/1993 | Holmes et al. ............ 701/111 |
| 5,263,364 A | * | 11/1993 | Nakayama et al. ........ 701/110 |
| 5,287,736 A | | 2/1994 | Nakayama et al. |
| 5,307,670 A | | 5/1994 | Imai et al. |
| 5,307,671 A | | 5/1994 | Akase |
| 5,497,328 A | * | 3/1996 | Sugai et al. ............... 701/101 |
| 5,506,778 A | * | 4/1996 | Matsumoto et al. ....... 701/111 |
| 5,809,969 A | | 9/1998 | Fiaschetti et al. |
| 5,893,897 A | * | 4/1999 | Volkart et al. ............ 701/110 |
| 5,991,684 A | * | 11/1999 | Fukuchi et al. ........... 701/110 |
| 6,006,155 A | * | 12/1999 | Wu et al. ................. 701/111 |
| 6,061,624 A | * | 5/2000 | Kashimura et al. ....... 701/110 |
| 6,439,198 B2 | * | 8/2002 | Lehner et al. ............ 701/111 |

FOREIGN PATENT DOCUMENTS

| | | |
|---|---|---|
| DE | 42 06 801 A1 | 9/1992 |
| DE | 197 41 965 C1 | 1/1999 |
| DE | 100 10 459 C1 | 4/2002 |
| EP | 0 708 234 A2 | 4/1996 |
| EP | 0 716 298 A2 | 6/1996 |
| EP | 0 823 622 A2 | 2/1998 |
| JP | 11 200915 | 7/1999 |

* cited by examiner

*Primary Examiner*—Stephen K. Cronin
*Assistant Examiner*—Arnold Castro

(57) ABSTRACT

According to methods known in prior art, a parameter which depends on the acceleration of the internal combustion engine is determined by means of a monitoring and analyzing system and is compared with a threshold value. According to the inventive method, the spread of said acceleration-dependent parameter is used for adjusting the threshold value to changes in the smoothness of running of the internal combustion engine.

8 Claims, 2 Drawing Sheets

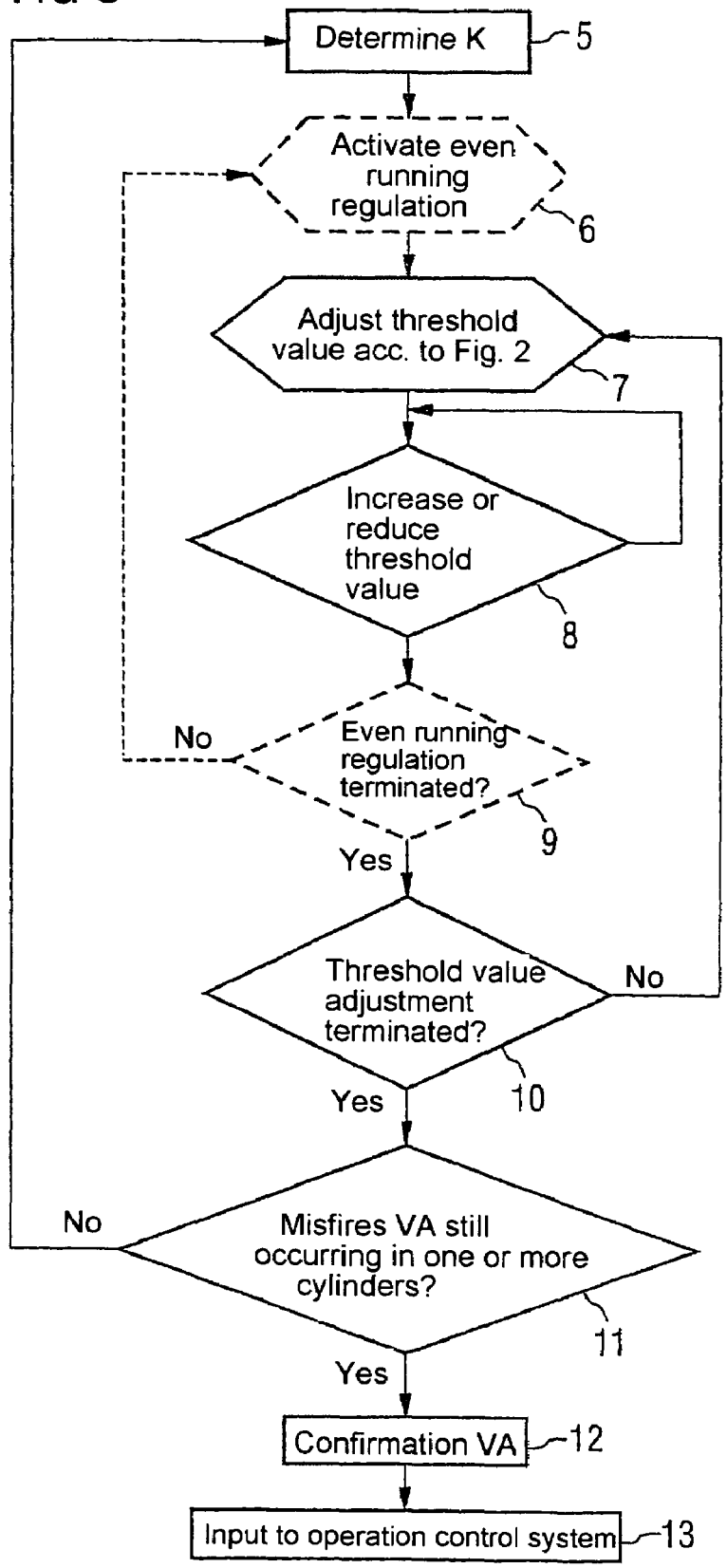

METHOD FOR THE DETECTION OF MISFIRES IN AN INTERNAL COMBUSTION ENGINE

CROSS REFERENCE TO RELATED APPLICATION

This application is the U.S. National Stage of International Application No. PCT/DE2003/003273, filed Oct. 1, 2003 and claims the benefit thereof. The International Application claims the benefits of German Patent applications No. 10254479.4 DE filed Nov. 21, 2002, all of the applications are incorporated by reference herein in their entirety.

FIELD OF THE INVENTION

The present invention relates to a method for detecting misfires in an internal combustion engine.

BACKGROUND OF THE INVENTION

Numerous methods for the detection of misfires in internal combustion engines are already known; see, for example, EP 0 708 234, EP 0 716 298 and U.S. Pat. No. 5,056,360. Said methods make use of the physical effect that a cylinder in which a misfire occurs exhibits a smaller acceleration value than adjacent cylinders. In the methods known in the prior art, this physical effect is made use of in such a way that a parameter dependent on the acceleration of the internal combustion engine, such as, for example, an acceleration index or what is known as a cylinder segment time is continually determined by means of a monitoring and analysis method while the internal combustion engine is running. Said parameter is then compared with a threshold value. The threshold value is defined as a function of the operating point of the internal combustion engine (e.g. as a function of the speed and load), and it is generally stored once during the calibration of the internal combustion engine in the operation control device of the internal combustion engine in the form of engine characteristic maps. Thus, if the parameter continually determined for the acceleration of the internal combustion engine falls below this threshold value, it is interpreted as the detection of a misfire in the cylinder in question.

A basic problem with these detection methods is that it is very difficult in specific operating phases of the internal combustion engine to differentiate speed variations caused by misfires from operation-related speed variations. Operating phases occurring at high speed and low load are particularly affected. At high speeds the time intervals (segment times) to be measured become shorter and shorter, with the result that it is not possible to define a threshold value that has a sufficiently large gap with respect to the continually determined speed-dependent parameter to allow error-free detection of misfires.

This also applies to operation of the internal combustion engine with non-optimal operating parameters, as is necessary for example for heating catalytic converters. In order to accelerate the heating process, the internal combustion engine is operated for example with an increased quantity of air and fuel, but with very late firing. Consequently, the firing and combustion of the fuel partially take place directly in the catalytic converter and not in the cylinder. The result is a very rapid increase in the exhaust temperature. As the internal combustion engine is operated in this case at a very late firing angle rather than at its optimal firing angle, there is also an increase in the uneven running of the internal combustion engine. This then leads to an increase in and a correspondingly large variance in the acceleration-dependent parameter, which makes misfire detection correspondingly more difficult.

In the prior art numerous algorithms were developed in order to take interfering influences in misfire detection into account and also permit reliable misfire detection even under unfavorable operating conditions of the internal combustion engine. Thus, for example, a switch can be made from one threshold value to another when switching between certain operating phases (catalytic converter heating or not). Numerous further refinements of the algorithms for misfire detection are also known, by means of which there has been a large measure of success in detecting misfires in relatively wide operating ranges of the internal combustion engine with sufficient reliability. However, this must generally be accomplished at the expense of a relatively computing and storage overhead in the operation control device of the internal combustion engine.

SUMMARY OF THE INVENTION

The object of the present invention is to specify a method for detecting misfires in an internal combustion engine that allows, in the simplest manner possible, reliable misfire detection even under unfavorable operating conditions.

The method according to the invention is defined in the claims.

In the method according to the invention, the starting point is a conventional misfire detection method in which a parameter dependent on the acceleration of the internal combustion engine is continually determined by means of a predefined monitoring and analysis method while the internal combustion engine is running and compared with a threshold value. The acceleration-dependent parameter is for example an acceleration index, a torque index, a segment time or a similar variable, as known for example from the aforementioned publications. In principle this parameter can be determined using any known monitoring and analysis method with a more or less complex algorithm, as is likewise known from the aforementioned publications.

The acceleration-dependent parameter is a reflection of the combustion efficiency, since it represents a measure for the torque contribution, generated by the combustion, of the individual cylinders. The variance or cyclical distribution of this parameter therefore reflects the even running of the internal combustion engine.

According to the invention, therefore, the variance of the acceleration-dependent parameter is determined and used to adjust the threshold value to changes in the even running of the internal combustion engine. In particular, the threshold value is increased if there is a reduction in the even running of the engine, and reduced if there is an increase in the even running of the engine.

In this way the threshold value for misfire detection can be continually and automatically adjusted to take account of changing operating states, thereby increasing the reliability of the misfire detection accordingly.

The variation range for the variance in the acceleration-dependent parameter can be specified in an arbitrary manner. A predefined time interval or a predefined number of power strokes is used as a variation range, for example.

The method according to the invention increases the reliability and accuracy of misfire detection across the entire operating range and during the entire lifetime of the internal combustion engine. Reliable misfire detection is provided in particular also during unfavorable operating phases such as, for example, during the heating of the catalytic converter. A further advantage of the method according to the invention is that it can be used during the calibration of the internal combustion engine, with the result that no separate specification of a threshold value for misfire detection is necessary. This simplifies the calibration method. All this is achieved with minimal computing and storage overhead, which means a corresponding reduction in the load on the electronic operation control device. The invention therefore makes a contribution to the optimization of the operation of the internal combustion engine with regard to fuel consumption and exhaust emissions.

Methods for controlling the even running of an internal combustion engine are already known in the prior art. With such methods, the combustion in the individual cylinders is corrected by modification of specific operating parameters such as injected fuel quantity, firing moment, etc. in such a way that the even running of the internal combustion engine is increased. Reference may be made for example to DE 197 41 965 C1. With this method the difference between actual value and desired value of a characteristic process variable, in particular a process variable that is dependent on the rotational acceleration of the individual cylinders, is used to correct the combustion in the individual cylinders. Variations in rotational acceleration between the individual cylinders are then compensated for by modification in particular of the allocated fuel quantity for each individual cylinder.

In further embodiment of the invention it is thus provided that the variance in the parameter dependent on the acceleration of the internal combustion engine is used for checking the result of the even running regulation process. If, for example, after the even running regulation has been performed and the adjustment of the threshold value has been completed, misfires continue to occur in one or more cylinders, the checking method according to the invention detects the combustion of said cylinder or cylinders as defective. In this way the malfunctioning of the cylinder in question is thus confirmed or verified. A fault message can then be generated.

As the variance of the acceleration-dependent parameter is determined in any case with the method according to the invention for adjusting the threshold value, the implementation of the described checking method requires only a slight additional overhead.

Further advantageous embodiments of the invention are derived from the dependent claims.

BRIEF DESCRIPTION OF THE DRAWINGS

Exemplary embodiments of the invention will be explained in more detail with reference to the drawing, in which:

FIG. 3 is a flowchart of a method for checking the result of an even running regulation.

DETAILED DESCRIPTION OF THE INVENTION

Figure 1:
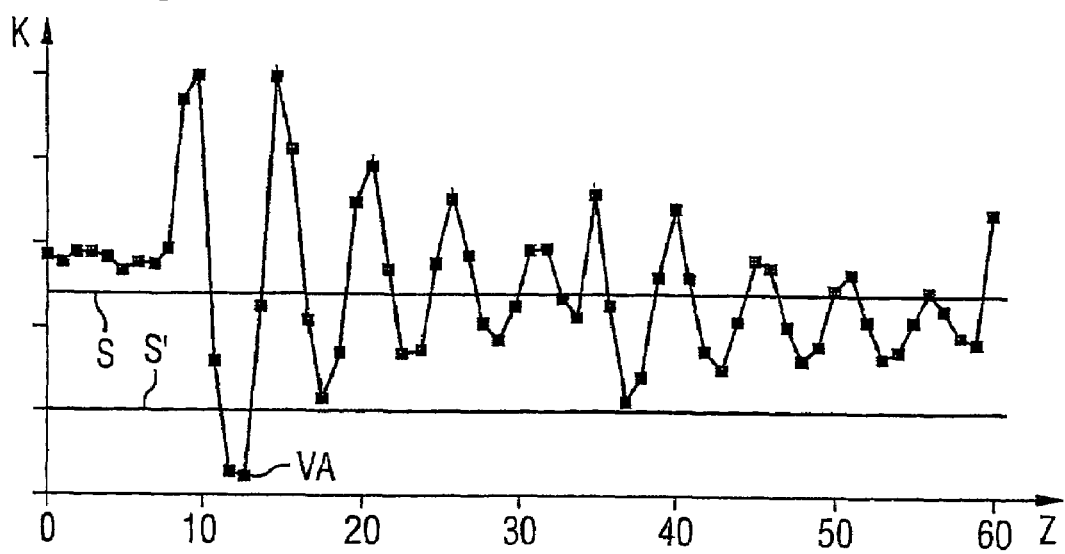
FIG. 1 shows a diagram in which a parameter K (acceleration index) is plotted against the power strokes Z of an internal combustion engine.

As explained in the introduction, with the conventional misfire detection methods a parameter dependent on the acceleration of the internal combustion engine is continually determined by means of a monitoring and analysis method while the internal combustion engine is running and then compared with a predefined threshold value. In FIG. 1, a parameter K of this kind is plotted against the power strokes Z of an internal combustion engine. In the exemplary embodiment shown, the parameter K is an acceleration index, as known for example from U.S. Pat. No. 5,056,360 cited at the beginning.

As the type of the monitoring and analysis method for determining the parameter K is not important in the present context and as, besides, monitoring and analysis methods of the said type are known, it will not be dealt with in further detail at this juncture. It is sufficient to point out that the acceleration index represents a measure for the acceleration of the crankshaft in a specific operating point of the internal combustion engine. If the acceleration index falls below the threshold value, this signifies that the cylinder in question has made no or only an inadequate torque contribution in this operating point, which is generally to be attributed to a misfire.

However, other parameters dependent on the acceleration of the internal combustion engine, such as, for example, the so-called segment times, could also be used instead of the acceleration index.

The segment times are the time intervals which the crankshaft requires during the power strokes of the individual cylinders for executing predefined angular spans. Since the determination and evaluation of segment times is also known, there is no need to explore this topic further here.

The diagram shown in FIG. 1 shows the progression of the parameter K (acceleration index). On the left-hand side of the diagram the parameter K is shown during optimal operation of the internal combustion engine. As can be seen, the parameter K changes only slightly in this operating range. The straight line designated by S represents a suitable threshold value for this operating range. If the parameter K drops below the threshold value S into this operating range, this indicates a misfire VA.

As can be seen, considerable deflections of the parameter K occur from approximately the 9th power stroke. This signifies an increased uneven running of the internal combustion engine, which is to be attributed to unfavorable operating conditions such as, for example, during the heating of a catalytic converter. In this case the extreme decline of the parameter K in the 11th and 12th power stroke is due to misfires VA. The misfires VA can be detected without difficulty by a comparison with the threshold value S. However, if the threshold value S remains unchanged, this leads to misfires being detected even though no misfires have actually occurred. The threshold value S must therefore be adjusted accordingly for operation of the internal combustion engine with increased uneven running, which is indicated by the straight line designated by S'.

The method according to the invention permits an automatic adjustment of the threshold value S to the even running of the internal combustion engine. An embodiment of this method will now be explained in further detail with reference to the flowchart shown in FIG. 2.

The parameter K is continually determined by means of a conventional misfire detection method (step 1). Following this, the variance of the parameter K, in other words the changes in K, is determined within a predefined variation range. A predefined time interval or a predefined number of power strokes Z can be selected for example as a variation range. If the variance remains substantially unchanged, the program returns to step 1.

If, however, the variance of the parameter K changes, this change is analyzed in a step 3. In particular a check is made to determine in which direction and to what extent the variance of the parameter K has changed.

Depending on the result of this analysis, the threshold value S is then increased or reduced (step 4). In the exemplary embodiment shown, this increase or reduction in the threshold value S is performed cyclically and incrementally.

In this way the threshold value S can be adjusted automatically and continuously to the even running or uneven running of the internal combustion engine during the entire lifetime of the internal combustion engine. It is thus ensured that error-free misfire detection is possible even during unfavorable operating conditions of the internal combustion engine.

A further aspect of the method according to the invention is explained with reference to the flowchart shown in FIG. 3. In this case use is made of the method for checking the even running regulation of an internal combustion engine, as explained with reference to FIG. 2. As already explained in the introduction to the description, methods for regulating the even running of an internal combustion engine are known in the prior art (e.g. DE 197 41 965 C1). In said methods, different torque contributions of the individual cylinders are adjusted to match one another by intervention in the firing and/or fuel injection in order to improve the even running of the internal combustion engine. The method illustrated in the flowchart in FIG. 3 is used for checking the result of an even running regulation of this kind.

The starting point is once again a conventional misfire detection method wherein the parameter K is continually determined (step 5). In a step 6, a conventional even running regulation method is now activated in order to improve the even running of the internal combustion engine.

Figure 2:
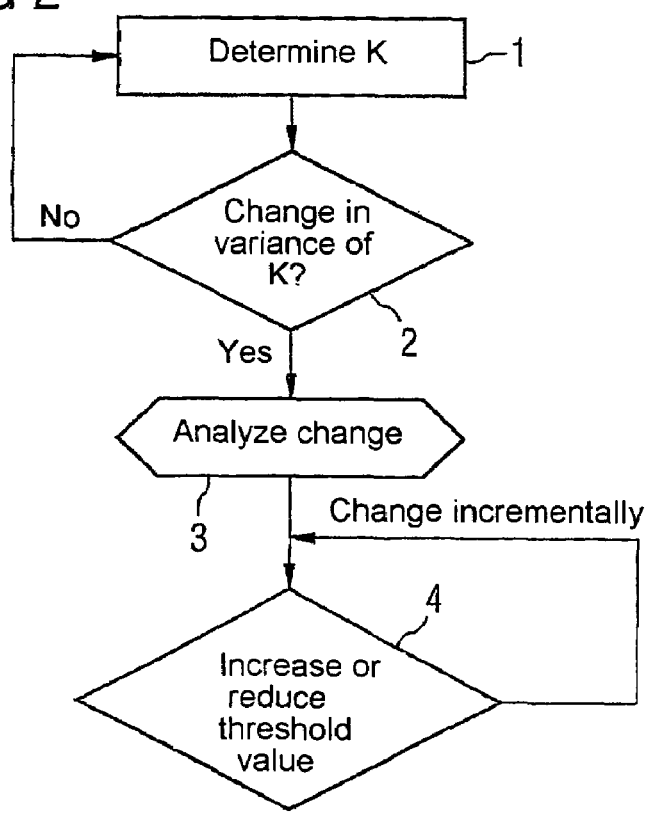
FIG. 2 is a flowchart of a method for adjusting a threshold value for misfire detection.

During this time the method for adjusting the threshold value S (steps 7 and 8), as explained with reference to the flowchart shown in FIG. 2, continues to execute. In a step 9 a check is made to determine whether the even running regulation has been completed. This can be the case, for example, after a predefined time interval, a predefined number of power strokes or upon reaching predefined limits for specific operating parameters.

As a result of the even running regulation, the variance of the parameter K is reduced. This leads in turn to a corresponding adjustment of the threshold value S. In step 10 a check is made to determine whether this threshold value adjustment has been completed.

Following termination of the threshold value adjustment, a check is made with the aid of the continually performed misfire detection to determine whether misfires are still occurring in one (or more) cylinders (step 11). If no further misfires occur, the program returns to its starting point. If, however, it is shown that misfires are continuing to occur in one (or more) cylinders, this is a sign that the combustion in the cylinder in question is defective due to a persistent malfunction. This leads to a confirmation of the misfire detection (step 12) and a corresponding input into the operation control system (step 13).

The described method thus allows a higher level of reliability in the detection of a real malfunction with regard to the combustion in one or more cylinders.

The invention claimed is:

1. A method for detecting misfires in an internal combustion engine, comprising:
   operating the internal combustion engine;
   continually determining a parameter that depends on an acceleration of the internal combustion engine by a monitoring and analysis method; and
   detecting the misfire based on a comparison of the parameter with a threshold value,
   wherein a variance in the parameter is determined and used to adjust the threshold value to take account of changes in the even running of the internal combustion engine.

2. The method as claimed in claim 1, wherein the threshold value is increased if there is a reduction in the even running of the engine and reduced if there is an increase in the even running of the engine.

3. The method as claimed in claim 1, wherein the adjustment of the threshold value is constantly repeated cyclically during operation of the internal combustion engine.

4. The method as claimed in claim 1, wherein the method is used during the calibration of the internal combustion engine.

5. The method as claimed in claim 1, wherein a predefined time interval or a predefined number of power strokes is used in each case as the variation range for the variance of the parameter.

6. The method as claimed in claim 1, wherein the method is performed on an engine cylinder-specific basis.

7. The method as claimed in claim 1, wherein an even running regulation method is used to correct the combustion in the cylinders of the internal combustion engine to increase the even running of the engine and the variance of the parameter is used to check the result of the even running regulation.

8. The method as claimed in claim 7, wherein if after the even running regulation has been performed and the adjustment of the threshold value has been completed, misfires continue to occur in a cylinder, the combustion of the cylinder is detected as defective.

* * * * *